Dec. 6, 1949     R. E. J. NORDQUIST ET AL     2,490,085
SHEET FEEDING AND GAUGING MECHANISM

Filed Aug. 19, 1947     11 Sheets-Sheet 1

INVENTORS
Ronald E. J. Nordquist
Bruno A. Bauman
BY Ivan D. Thornburgh
Charles H. Erne
ATTORNEYS

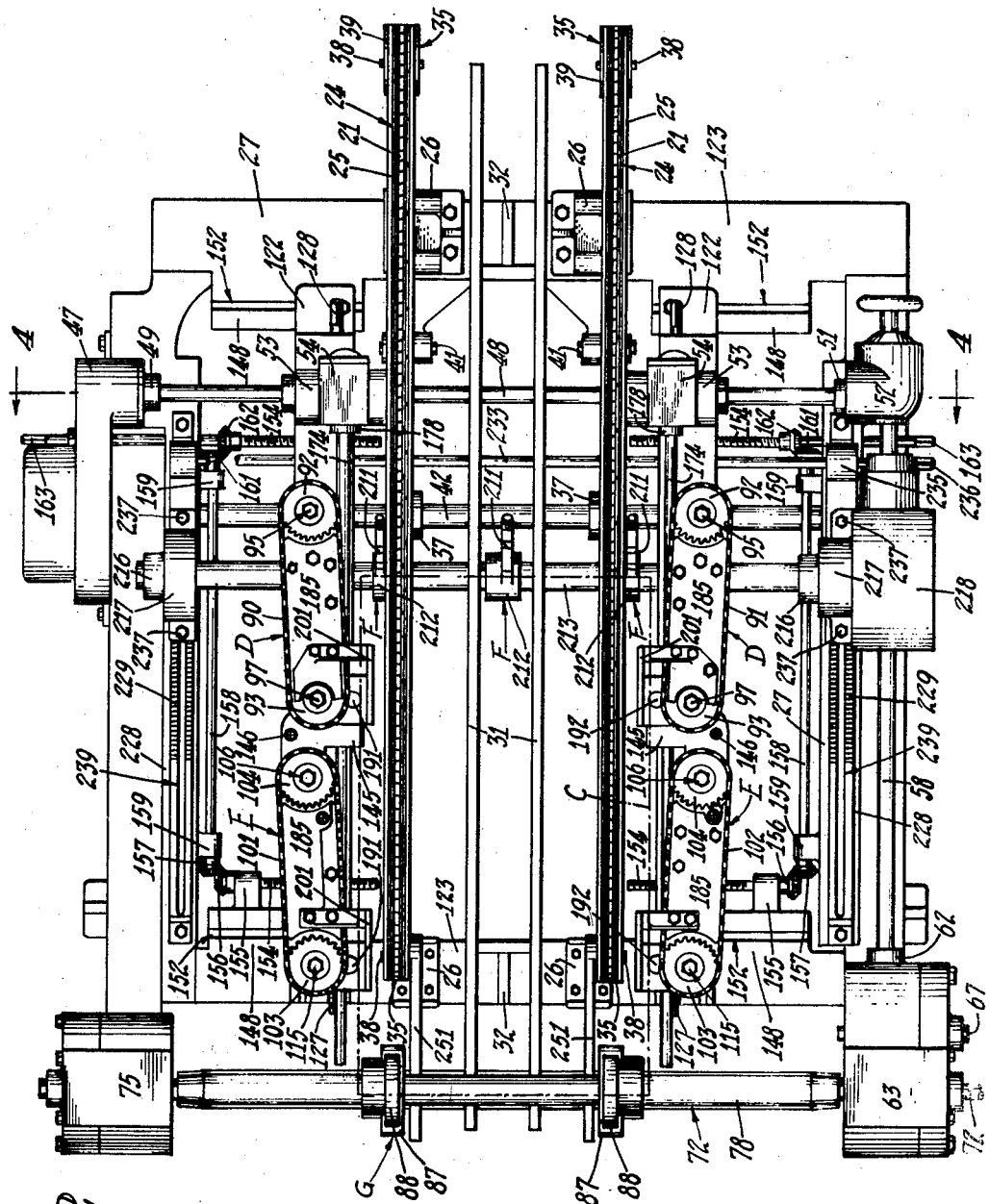

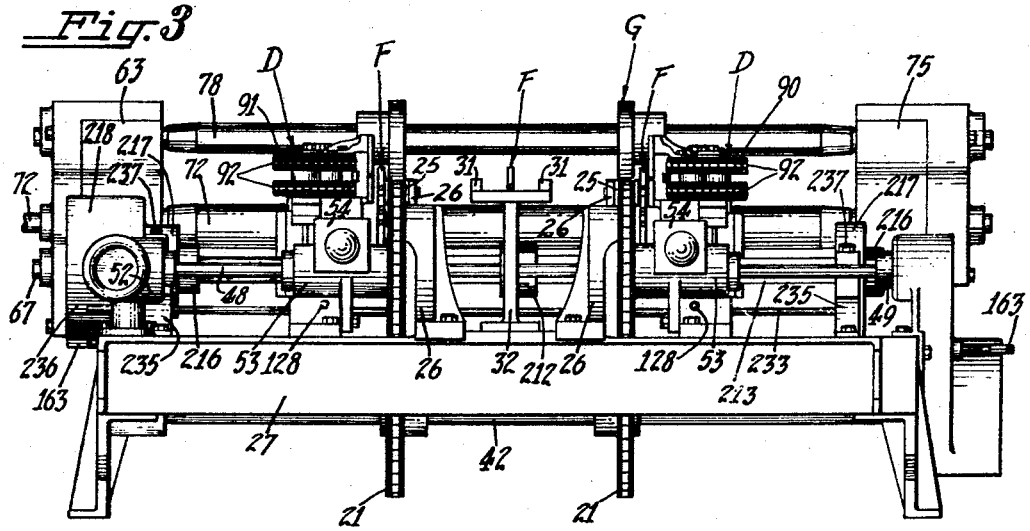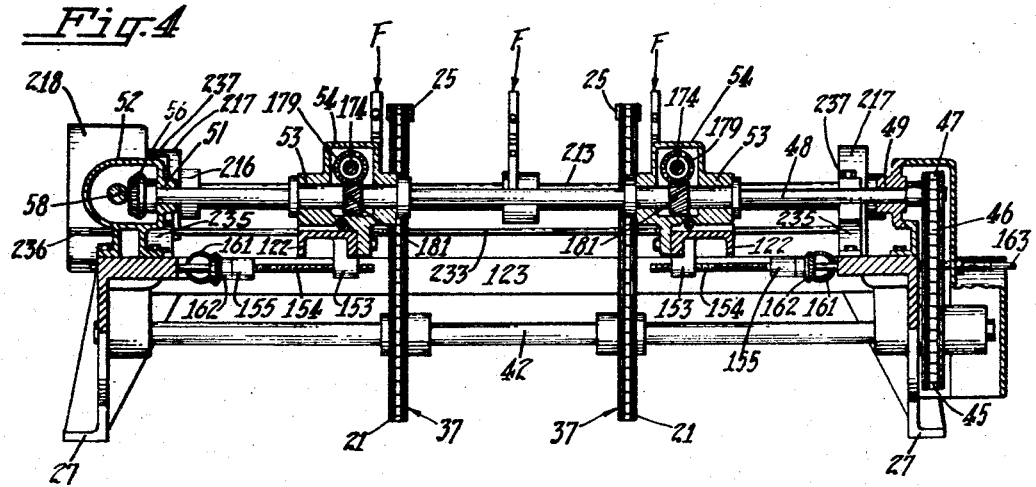

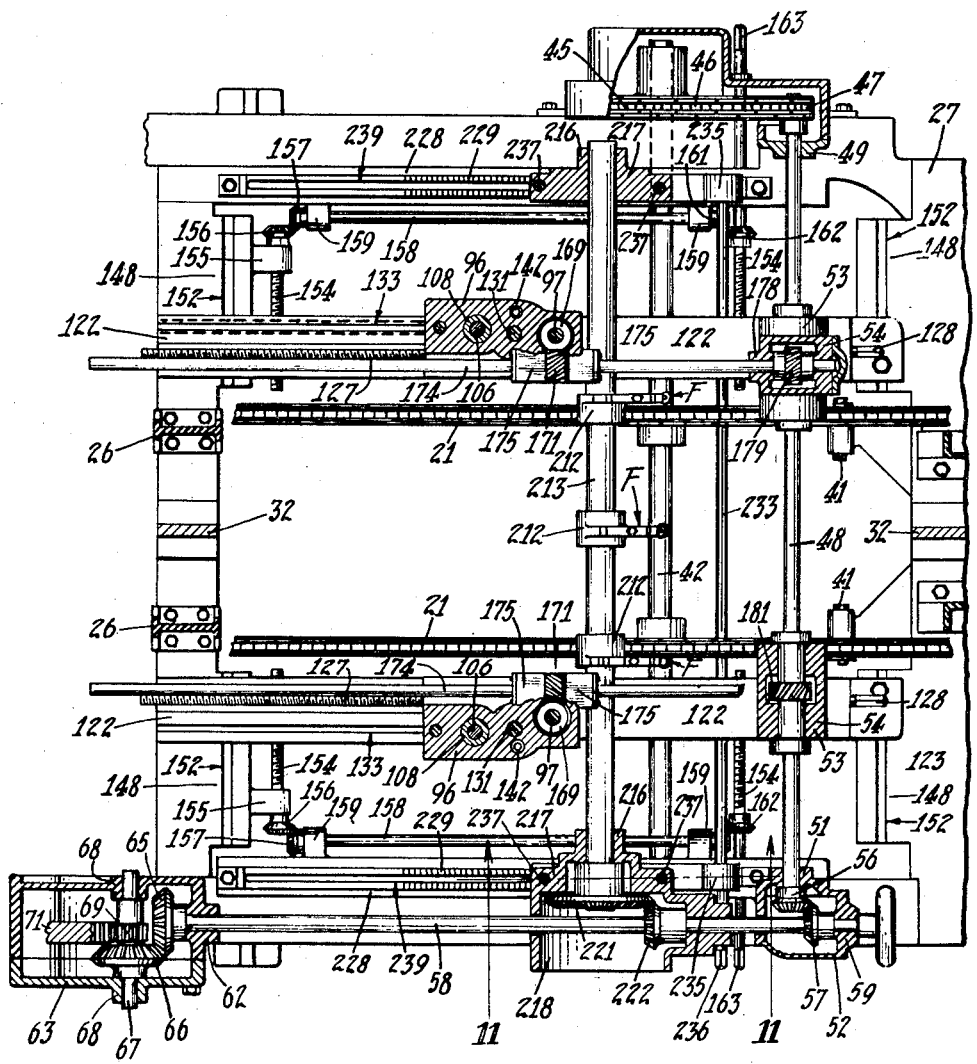

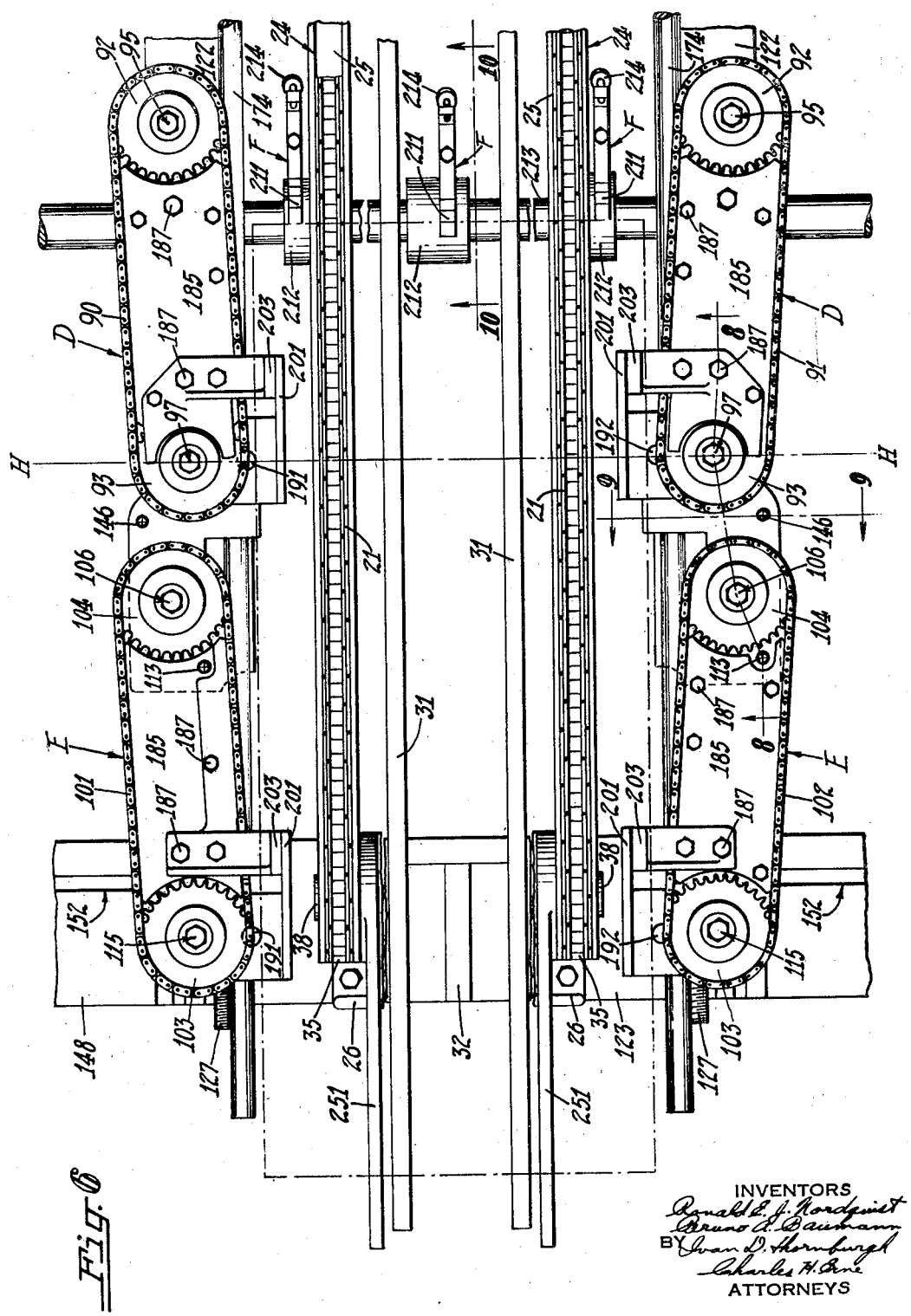

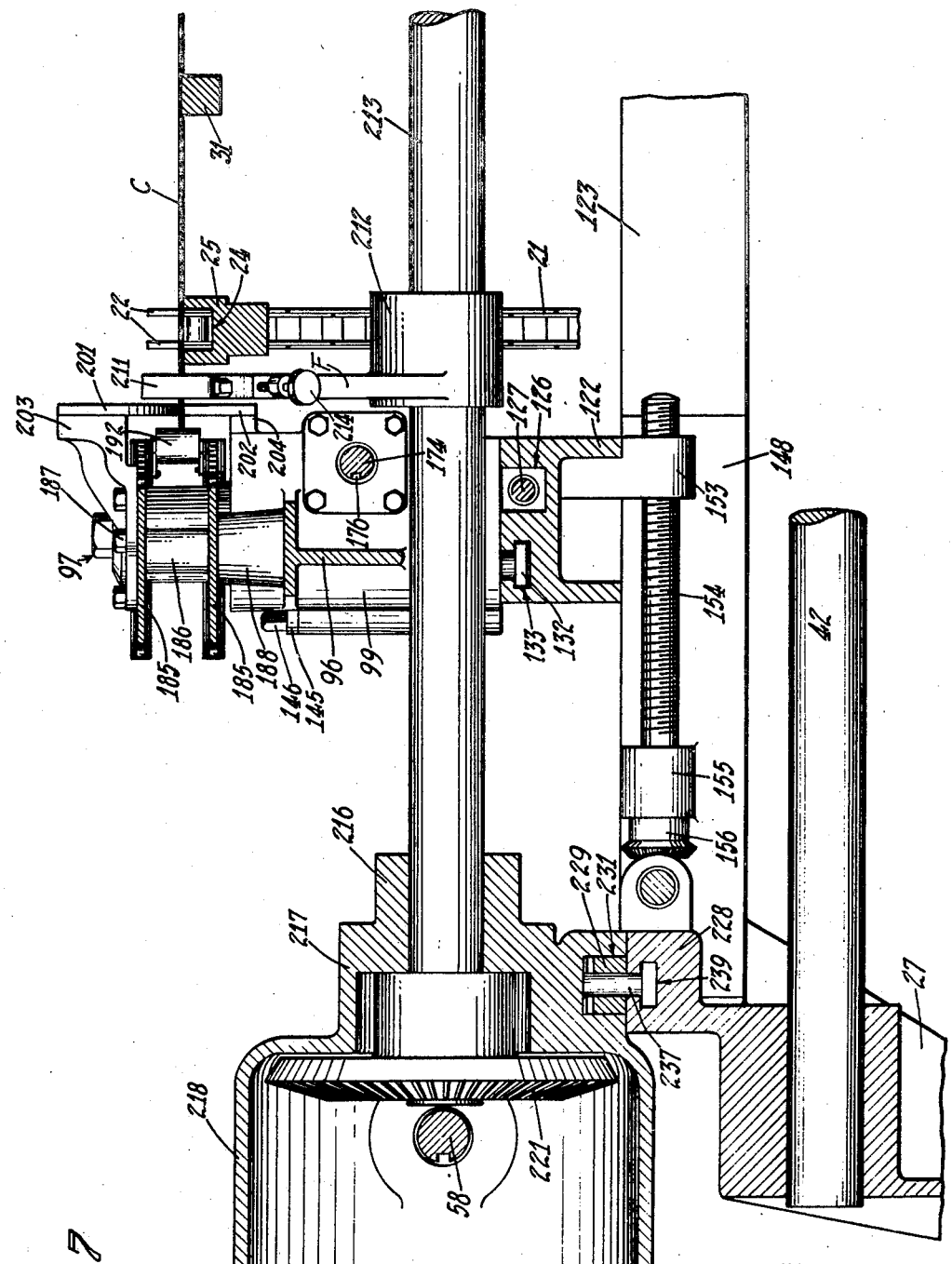

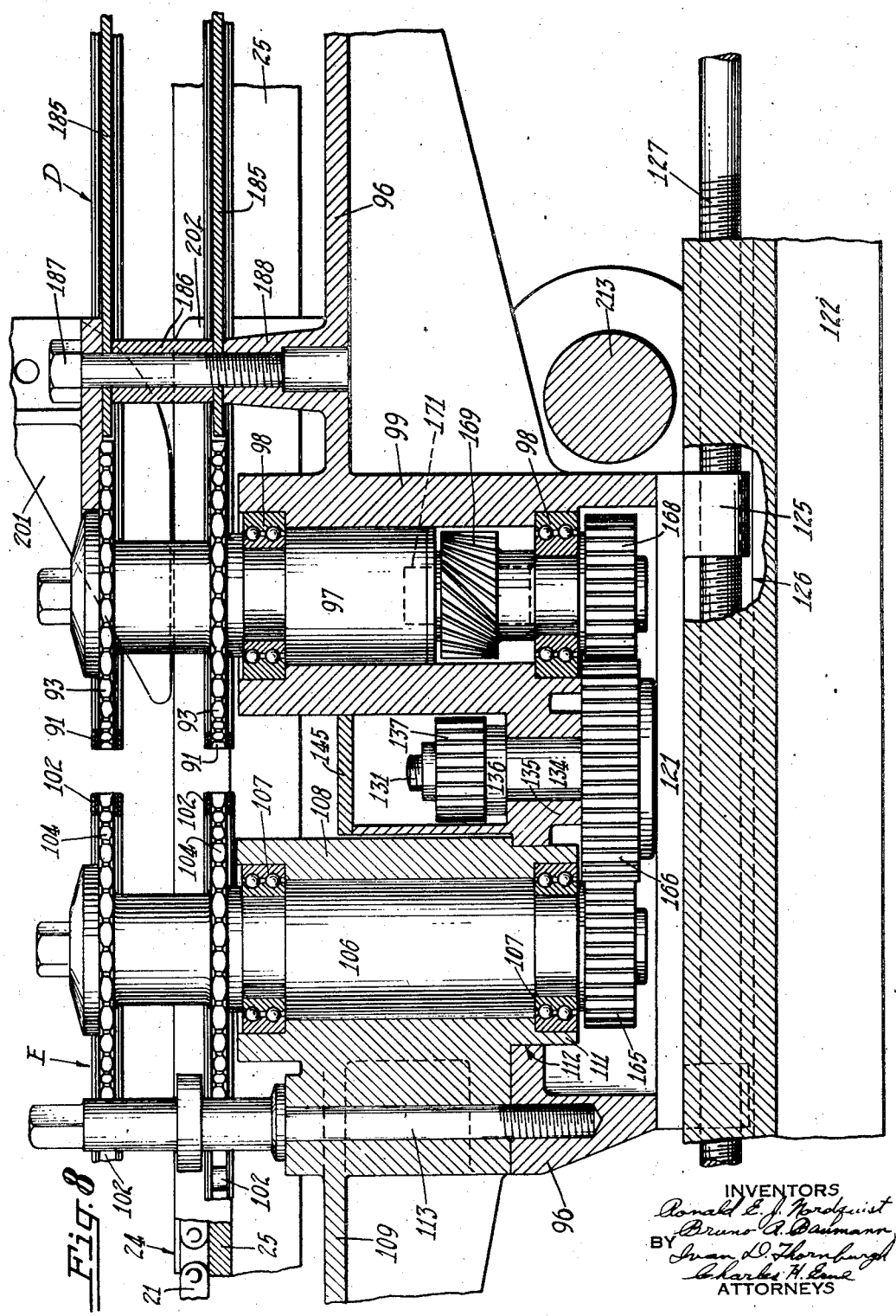

Dec. 6, 1949   R. E. J. NORDQUIST ET AL   2,490,085
SHEET FEEDING AND GAUGING MECHANISM
Filed Aug. 19, 1947   11 Sheets-Sheet 8
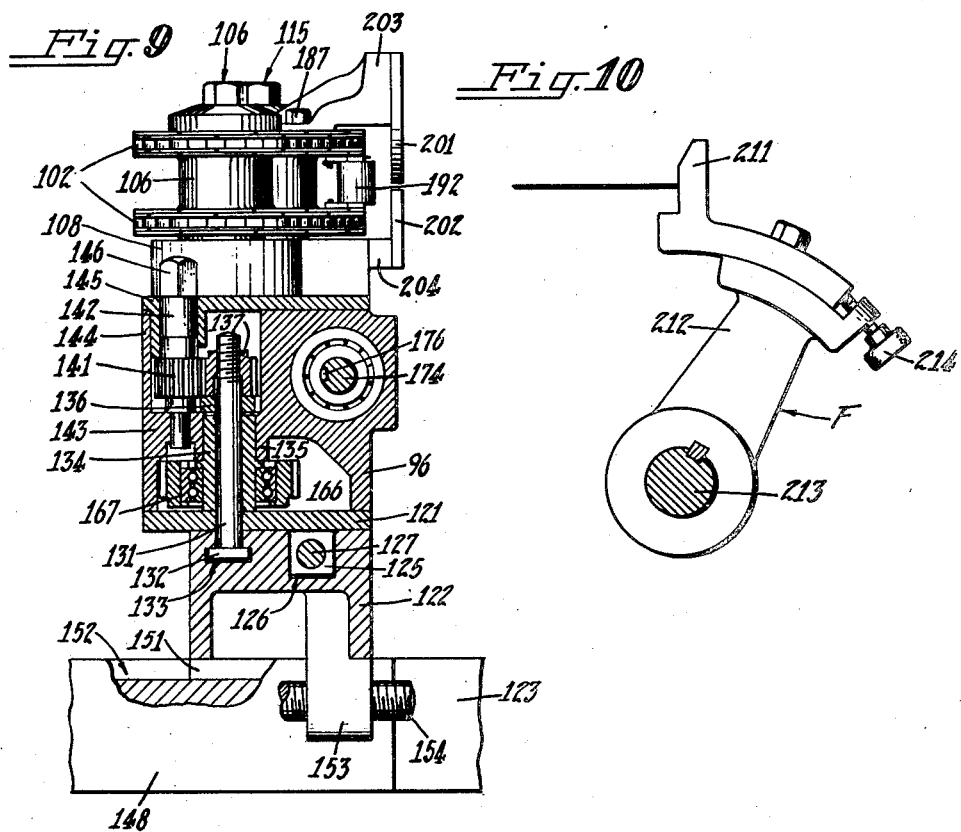
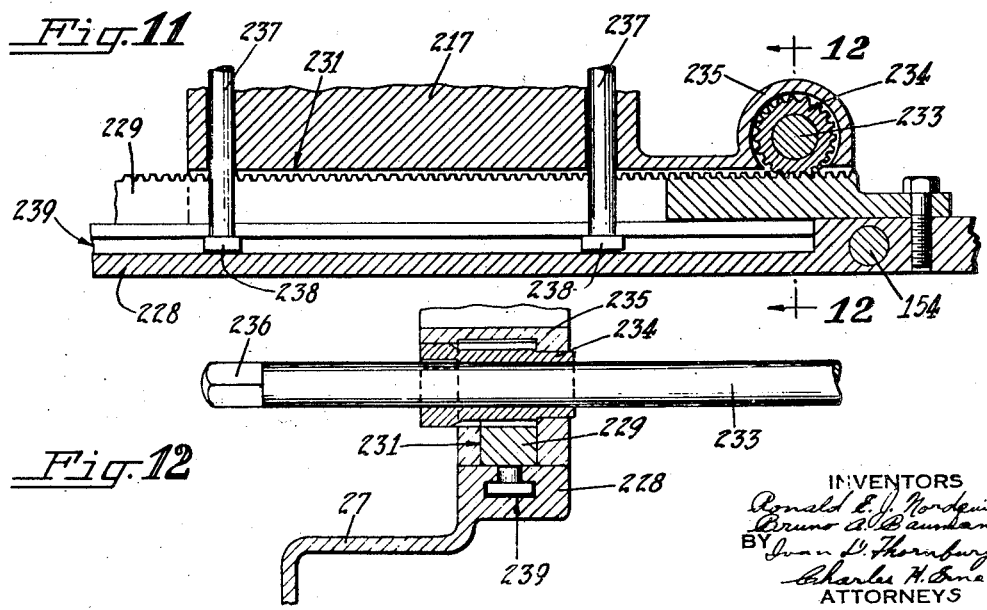

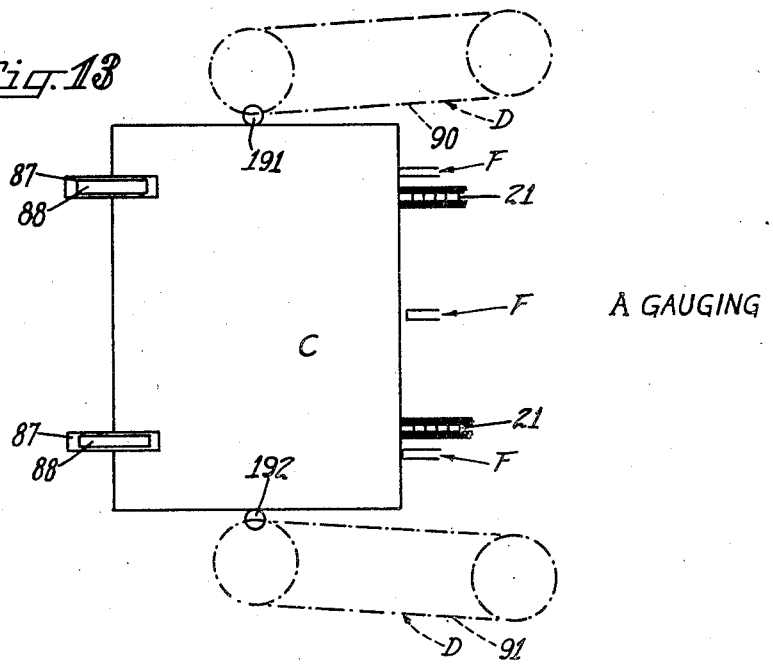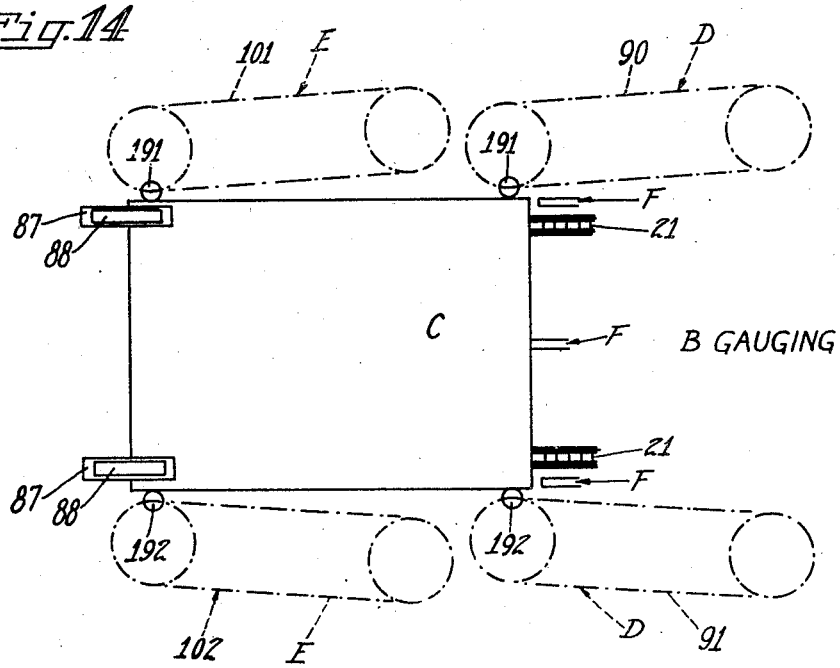

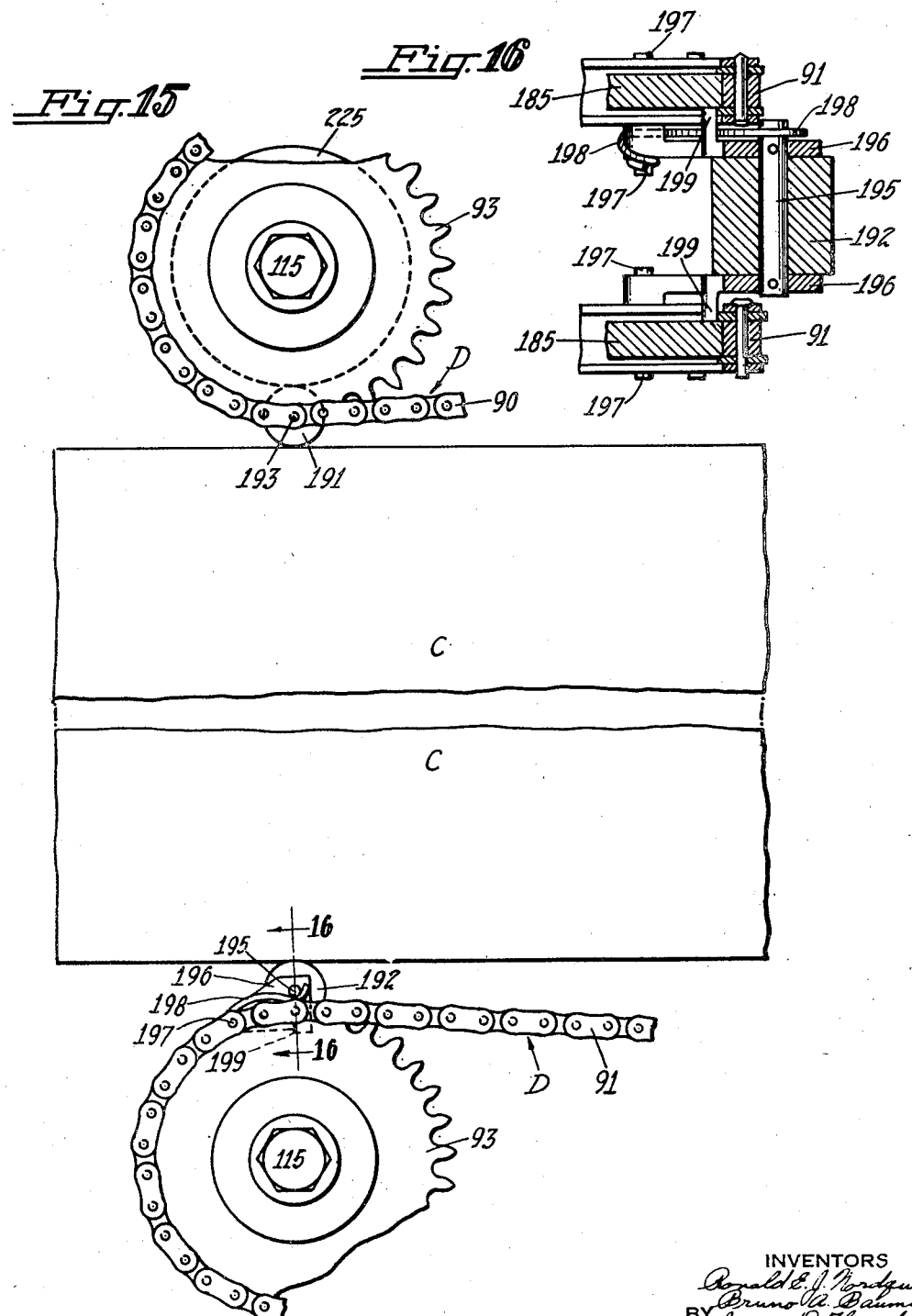

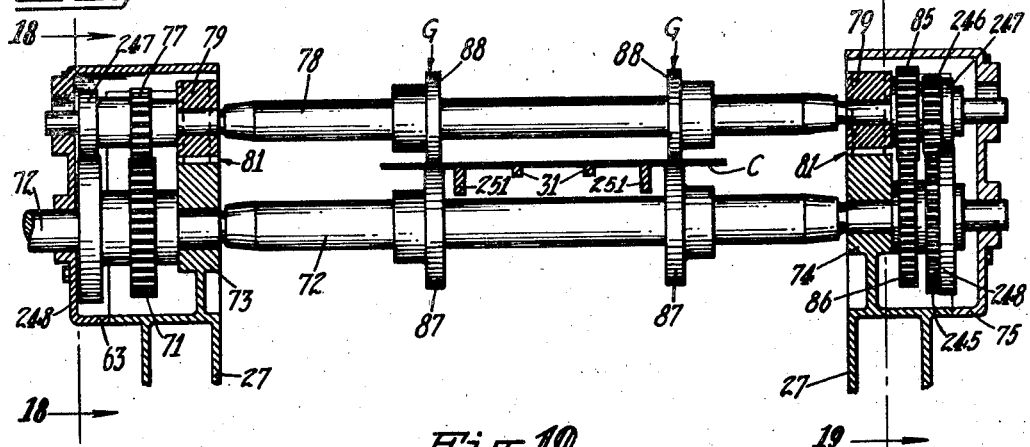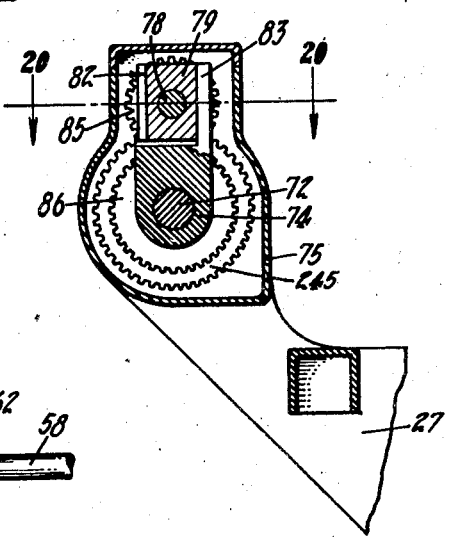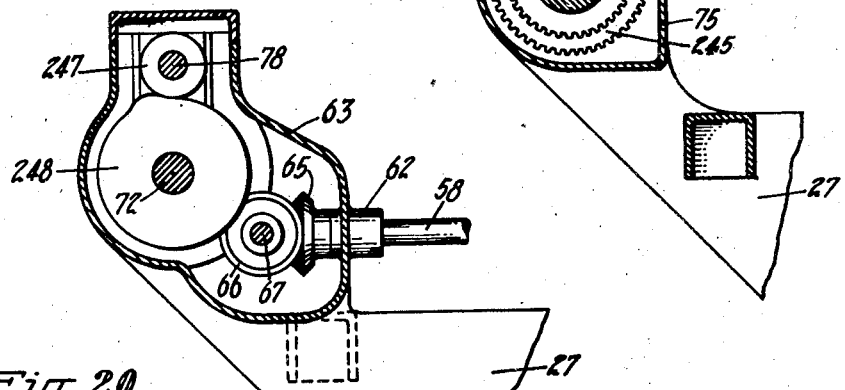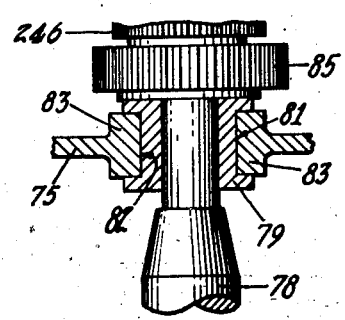

Patented Dec. 6, 1949

2,490,085

UNITED STATES PATENT OFFICE 2,490,085

SHEET FEEDING AND GAUGING MECHANISM

Ronald E. J. Nordquist, Maplewood, and Bruno A. Baumann, Newark, N. J., assignors to American Can Company, New York, N. Y., a corporation of New Jersey Application August 19, 1947, Serial No. 769,365

18 Claims. (Cl. 271—59)

The present invention relates to a sheet feeding and gauging mechanism in which sheet material is required to be located in an accurate predetermined position for further treatment and has particular reference to gauging devices which are effective against the edges of sheets at selectable gauging points for different sizes of sheets so that different kinds of gauging may be accomplished in the one mechanism. Reference is here made to our copending United States application Serial Number 769,364 filed August 19, 1947, on Sheet feeding and gauging mechanism.

In the feeding of sheet material such as for example, sheets of tin plate or the like, from which container or can parts are made, the sheets are usually gauged by a three point system of gauging so that the sheets may be precisely located each time an operation is performed upon them, whether or not these operations are performed in the same machine or in different machines. In all three point gauging, two of the gauge points are taken along one edge of the sheet while the third gauge point is taken along an adjacent edge of the sheet.

There are two kinds of three point gauging known in can making practice; i. e. A gauging and B gauging. The type of gauging selected depends upon the dimensions of the sheets being fed and the type of operation being performed on the sheets. Usually the sheets are of rectangular form, i. e. where one dimension is greater than the other.

In some cases it may be more practical to feed the sheets through a machine with their long dimension transversely of the machine and their short dimension co-extensive with the path of travel of the sheets. In such a case two back gauge points disposed along the rear edge or long dimension of the sheet would be used with one side gauge point disposed substantially midway between the ends of one of the short side edges of the sheet. This is known as A gauging.

In B gauging, the gauging points are reversed; one back gauge point being used along the rear edge midway between its ends with two side gauge points being used along one of the side edges. This type of gauging is better suited for feeding sheets with their short dimension extending transversely of the machine and their long dimension coextensive with the path of travel of the sheets.

Heretofore each feeding mechanism was designed and built for one type of gauging and was not convertible to another type. This necessitates a number of different feeding mechanisms for different types of gauging and for different sizes of sheets.

The instant invention contemplates overcoming this difficulty by providing a sheet feeding and gauging mechanism in which both types of gauging may be readily had and in which many different sizes of sheets covering the full range of sheet sizes used in the can making industry may be gauged and fed in the same machine.

An object, therefore, of the instant invention is the provision in a sheet feeding and gauging mechanism of gauging devices which are effective against the edges of sheets at selectable gauging points for sheets of different dimensions so that different types of gauging may be used in the same mechanism in accordance with the relative position of the sheets as they pass through the mechanism.

Another object is the provision of such gauging devices which are readily adapted to high speed operation so that the sheets may be accurately gauged while they are passing through the mechanism in a continuous procession at a high rate of speed.

Another object is the provision of such gauging devices wherein a change from one type of gauging to another may be effected rapidly and with a minimum of effort so that the productiveness of the machine may be greatly enhanced.

Another object is the provision of such gauging devices wherein engagement with the sheet is effected gradually and gently with sufficient time provided for smoothly shifting the sheets into properly gauged position without in any way marring or damaging the sheets.

Numerous other objects and advantages of the invention will be apparent as it is better understood from the following description, which, taken in connection with the accompanying drawings, discloses a preferred embodiment thereof.

Referring to the drawings:

Fig. 2 is a top plan view of the mechanism shown in Fig. 1;

Fig. 3 is an end elevation of the mechanism shown in Fig. 1 as viewed from the right in that figure;

Fig. 4 is a transverse section taken substantially along the line 4—4 in Fig. 2;

Fig. 5 is a horizontal section taken substantially along the line 5—5 in Fig. 1, with parts broken away;

Fig. 6 is an enlarged fragmentary top plan view of a portion of the machine shown in Fig. 2, with parts broken away;

Fig. 7 is an enlarged transverse sectional view taken substantially along the broken line 7—7 in Fig. 1, with parts broken away;

Fig. 8 is an enlarged sectional view taken substantially along the broken line 8—8 in Fig. 6, with parts broken away;

Fig. 9 is an enlarged sectional view taken substantially along the line 9—9 in Fig. 6, with parts broken away;

Figure 1:
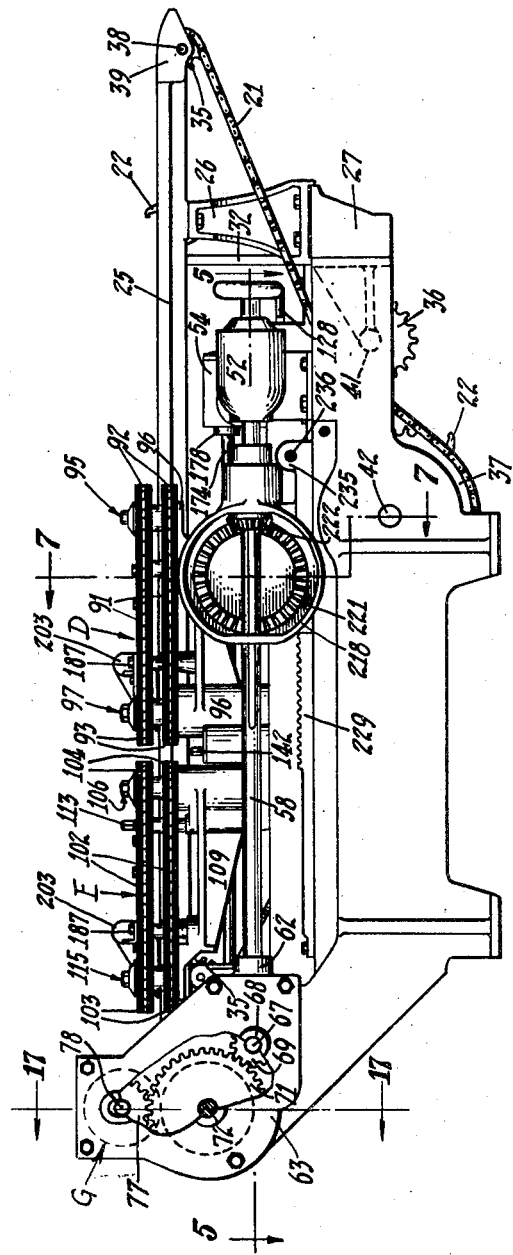
Figure 1 is a side view of a sheet feeding and gauging mechanism embodying the instant invention, with parts broken away.

Figs. 10, 11 and 12 are enlarged sectional details taken substantially along the respective lines 10—10 in Fig. 6, 11—11 in Fig. 5 and 12—12 in Fig. 11, with parts broken away;

Figs. 13 and 14 are schematic views illustrating a sheet and the gauging devices in different positions in accordance with the type of gauging being used.

Fig. 15 is an enlarged schematic plan view of the gauging devices at the gauging station with a sheet in position between the gauging device, parts of the device and the sheet being broken away;

Fig. 16 is a greatly enlarged sectional detail taken substantially along the line 16—16 in Fig. 15, with parts broken away;

Fig. 17 is a transverse sectional view taken substantially along the line 17—17 in Fig. 1, and showing a sheet in position, with parts broken away;

Figs. 18 and 19 are sectional details taken substantially along the respective lines 18—18, 19—19 in Fig. 17, with parts broken away; and Fig. 20 is an enlarged sectional detail taken substantially along the line 20—20 in Fig. 19.

When a sheet is to be gauged by the A gauging method the side gauges D are used alone as shown in Fig. 13. When B gauing is to be used both of the side gauges D, E are used as shown in Fig. 14. In either case the gauging elements gradually move inwardly toward the moving sheet and engage gently against its two opposite side edges and thereby shift the sheet into a predetermined side gauged position. This gentle and gradual locating of the sheet is readily effected while the sheet is moving at a high rate of speed.

As the sheets move into a side gauged position the back gauges F (Fig. 2) come into engagement with the rear edge of the moving sheet and bring this edge into a squared-up or gauged position and this completes the full gauging of the sheet. There are three of these back gauges F and they are used selectively in accordance with the type of gauging being used. For A gauging where only one side gauge is used, two of the back gauges are used to complete the three point gauging as shown in Fig. 13. For B gauging where two side gauges are used, only one back gauge is used as shown in Fig. 14.

As a preferred embodiment of the instant invention the drawings illustrate principal parts of a sheet feeding and gauging mechanism for feeding and gauging sheets C (Figs. 13 and 14) of tin plate or the like sheet material and for advancing them into a sheet treating machine such as a printing machine, coating machine, scroll shear, slitter or other machine used for preparing or converting the sheets into container or can parts. The mechanism is equipped with two sets of side gauges D, E (Fig. 2) and a set of back gauges F for gauging the sheets C by either the A gauging (Fig. 13) or the B gauging (Fig. 14) methods in accordance with the size and manner of feeding the sheets through the mechanism.

In such a feeding and gauging mechanism the sheets C are advanced along a straight line path of travel between a pair of the side gauges D and a second adjacent pair of the side gauges E. Each pair of side gauges are disposed at converging angles and include side gauging elements moving in time with the sheet.

Immediately upon location of the sheet in its gauged position, the forward or leading edge of the sheet is gripped between advancing instrumentalities G which take the sheet away from the gauging elements and advance it rapidly into the subsequent operation machine while retaining the sheet in its gauged position. This completes the cycle of operation of the sheet into and through a gauged position.

In the mechanism the gauging devices D, E, F are movable into various positions for accommodating them to sheets of different dimensions and for this purpose the gauges as well as their associated parts are made adjustable. In cases where the side gauging device D is used alone, as in A gauging, the cooperating side gauge E is removed so that the gauge D may be shifted into a proper gauging position. For this purpose the side gauge E is mounted in such a manner that it may be removed rapidly as a unitary structure.

The sheets C to be gauged and advanced into the subsequent operation machine for further treatment are fed into the feeding mechanism at the right as viewed in Fig. 1, from any suitable source of supply. The entering sheets travel in a continuous procession one behind the other in spaced relation on a pair of endless feed chains or conveyors 21 (Figs. 1 and 2) having feed dogs 22 secured thereto at spaced intervals along the chains for propelling engagement with the rear transverse edge of the sheets. The upper or feeding runs of these chains operate in longitudinal guide grooves 24 (see also Figs. 6 and 7) formed in support rails 25 which extend longitudinally of the feeding mechanism. These support rails are mounted on brackets 26 bolted to a frame 27 which constitutes the main frame of the mechanism.

The sheets C during their travel through the mechanism rest in a horizontal flat position on the support rails 25 and on a pair of spaced and parallel auxiliary support rails 31 disposed between the support rails 25 near the path of travel of the center portion of the sheets. The auxiliary support rails 31 are carried on support brackets 32 disposed adjacent the ends of the rails and mounted on the main frame 27.

The feed chains 21 operate over two pairs of idler sprockets 35 (Figs. 1, 2 and 6), a pair of auxiliary idler sprockets 36, and a pair of driving sprockets 37. The idler sprockets 35 are mounted on short shafts 38 journaled in bearings 39 formed on and at the ends of the two support rails 25. The auxiliary idler sprockets 36 are mounted in spaced relation on short transverse shafts 41 journaled in bearings formed in the main frame 27 (see Fig. 1). The driving sprockets 37 are mounted in spaced relation on a transverse driving sprocket shaft 42 which is journaled in suitable bearings formed in the main frame 27 adjacent the short transverse shafts 41.

The driving sprocket shaft 42 is continuously rotated by a drive sprocket 45 (Figs. 4 and 5) which is mounted on one end of the shaft. The drive sprocket is rotated by an endless drive chain 46 which operates over a sprocket 47 carried on one end of a transverse gear shaft 48. This end of the gear shaft is journaled in a bearing bracket 49 secured to the main frame 27. The opposite end of the shaft is journaled in a bearing 51 formed in a gear casing 52 bolted to the main frame. Intermediate its ends the shaft is journaled in suitable bearings 53 formed in a pair of gear housings 54 which are movable along the shaft for a purpose to be hereinafter explained.

In the gear casing 52, the gear shaft 48 carries a bevel gear 56 which meshes with a bevel gear 57 mounted on an auxiliary drive shaft 58 journaled in a bearing 59 formed in the gear casing. The auxiliary drive shaft 58 extends beyond the gear casing 52 and is journaled in a bearing 62 formed in a drive housing 63 located at the exit end of the feeding mechanism.

The auxiliary drive shaft 58 terminates within the drive housing 63 and carries on this end of the shaft a bevel gear 65 (Fig. 5). Gear 65 meshes with and is driven by a bevel gear 66 which is mounted on a short cross shaft 67 journaled in bearings 68 formed in the drive housing. The cross shaft carries a pinion 69 which meshes with and is driven by a differential gear 71 (see also Figs. 1, 2 and 17) loosely mounted on but not directly driven by a main driving shaft 72 which extends across the exit end of the feeding mechanism. One end of this driving shaft is journaled in a bearing 73 formed in the drive housing 63. The other end of the driving shaft is journaled in a bearing 74 formed in an auxiliary drive housing 75 located on the opposite side of the feeding mechanism main frame 27.

The differential gear 71 meshes with and is driven by a pinion 77 secured to one end of a roller shaft 78 disposed above and in parallelism with the driving shaft 72. The ends of the roller shaft are journaled in rectangular shaped bearing blocks 79 (Figs. 17 and 19) disposed in slide openings 81 in the drive housing 63 and in the auxiliary drive housing 75. These bearing blocks are movable vertically in the housing openings 81 to permit of a slight vertical movement of the roller shaft 78 relative to the driving shaft 72 for a purpose to be hereinafter explained. For this purpose the vertical edges of the bearing blocks 79 are formed with slide grooves 82 (Figs. 19 and 20) which partially surround and operate against vertical slides 83 formed in the housings adjacent the slide openings 81.

In the auxiliary drive housing 75 the roller shaft 78 carries a gear 85 (Figs. 17 and 19) which meshes with and which is driven by a main driving gear 86 secured to the main driving shaft 72. The main driving shaft is rotated in any suitable manner. The main driving shaft 72 and the roller shaft 78 carry respectively lower and upper cooperating advancing rollers 87, 88 for advancing the gauged sheets into the subsequent operation machine.

Hence through this gear train the main driving shaft 72 and its gear 86, rotates the gear 85 and the roller shaft 78, and through this roller shaft its gear 77 drives gear 71 and pinion 69 of the short cross shaft 67, the auxiliary drive shaft 58, the transverse gear shaft 48 and the sprocket shaft 42 in proper synchronism and thereby actuates the feed chains 21 in the proper timed relation for advancing the sheets 7 to be gauged along a straight line path of travel through the feeding mechanism as hereinbefore mentioned.

Side gauging of the moving sheets C while they are propelled by the conveyors 21 toward the exit end of the mechanism is effected by the side gauges D, E as hereinbefore mentioned. There are two of each of these gauges located one on each side of the straight line path of travel of a sheet C through the mechanism and they are of similar construction.

The side gauges D include two sets of endless chain conveyors 90, 91 (Figs. 1, 2, 3 and 6) which are disposed in a horizontal position and at a slight angle to the path of travel of the sheets propelled by the feeding conveyors 21. These gauging conveyors on both sides of the path of travel of the sheets converege toward the exit end of the feeding mechanism. Each of the conveyors 90, 91 comprises a pair of spaced and parallel, upper and lower chains which operate as a unitary double conveyor structure.

Each set of gauging chains 90, 91 operate over pairs of spaced double sprockets, which constitute idler sprockets 92 and driving sprockets 93 (Fig. 6). The idler sprockets 92 of each set of chains are mounted on a stationary vertical stud 95 (Figs. 1 and 6) which is secured in one end of a movable carriage 96. There are two of these carriages disposed on opposite sides of and adjacent the path of travel of the sheets. The driving sprockets 93 of each set of chains are secured to the upper end of a vertically disposed driven shaft 97 (see Fig. 8) which is mounted on a pair of spaced ball bearings 98 carried in a retainer 99 formed in the carriages 96.

The side gauges E are similar to the side gauges D and include two sets of endless chain conveyors 101, 102 (Figs. 1, 2 and 6) which are disposed in a horizontal position between the side gauges D and the exit end of the mechanism. Like the gauges D, these gauges E are arranged at a slight angle to the path of travel of the sheets propelled by the feeding conveyors 21. These gauging conveyors 101, 102 on both sides of the path of travel of the sheets converge toward the exit end of the mechanism. Each of the conveyors comprises a pair of spaced and parallel, upper and lower chains which operate, as a unitary double conveyor structure, over double idler sprockets 103 and double driving spockets 104.

The side gauges E are used only in cooperation with the side gauges D for B gauging of sheets as shown in Fig. 14 and are readily removable from the mechanism when the side gauges D are to be used alone for A gauging of the sheets as shown in Fig. 13. For this purpose each of the driving sprockets 104 of the gauges E are secured to the upper end of a vertically disposed driven shaft 106 (see Fig. 8) which is mounted on a pair of spaced ball bearings 107 carried in a retainer 108 of a bracket 109 removably bolted to the carriages 96.

The lower end of the bracket retainer 108 is formed with a centralizing hub 111 which fits within a locating bore 112 formed in the carriage for locating the retainer 108 of the bracket in a predetermined relation to the carriage. A single long bolt 113 which is readily removable, secures the bracket 109 to the carriage. By removing this bolt the entire bracket and the gauging conveyors E mounted thereon may be rapidly removed from the mechanism. The idler sprockets 103 of these gauges are mounted on stationary vertical studs 115 (Fig. 6) secured in the brackets 109.

Gauging of the sheets by either of the A or B gauging methods is effected in relation to the advancing rollers 87, 88 respectively mounted on the main driving shaft 72 and the roller shaft 78 disposed at the exit end of the mechanism. Hence when the side gauges E are removed to permit the use of the gauges D alone for A gauging of the sheets as shown in Fig. 13, the gauges D must be shifted closer to the advancing rollers 87, 88 in order to properly gauge the sheets. For this purpose the gauge carriages 96 are secured to slide plates 121 (Figs. 8 and 9) which rest on and are slidable along a pair of slide rails 122 supported on cross beams 123 of the main frame 27 (see also Fig. 5). The carriages 96 are guided by lugs 125 (Figs. 8 and 9) which extend down from the slide plates 121 and operate in longitudinal grooves 126 formed in the slide rails 122.

Shifting of the carriages is effected manually by long actuating screws 127 (see also Figs. 2 and 5) which are threadedly engaged in the guide lugs 125. There are two of these actuating screws, one for each of the carriages 96, and they extend the full length of the feeding mechanism. Adjacent the feed-in end of the mechanism the screws are held against displacement in the slide rails 122 and are formed with square heads 128 (Fig. 2) for receiving a removable crank for turning the screws.

After a longitudinal adjustment of the carriages 96, they are locked in position against their slide rails 122 to maintain the side gauges D, E or the side gauges D alone which ever is used, in their adjusted location. This is brought about manually by a locking bolt 131 (Fig. 9) having a T-shaped head 132 which operates in a T slot 133 formed in the slide rails 122. These T slots are disposed adjacent and parallel with the slide grooves 126 in the rails.

The locking bolts 31 extend up through the slide plates 121 and through a sleeve 134, the upper end of which is rotatably carried in a bearing 135 formed in the carriages 96. The upper end of the bolt extends through a lock washer 136. Above the washer the bolt is threaded and carries an adjusting gear nut 137 which is rotatably movable against the washer for drawing the bolt head 132 into a locking position within the T slot 133. It is this action of the bolts that lock the carriages in their adjusted positions.

Rotation of each of the adjusting gear nuts 137 preferably is effected individually by gears 141 which are formed on vertical shafts 142 carried in bearings 143 formed in the carriages and bearings 144 in plates 145 secured to the carriages. The upper ends of the shafts are provided with square heads for the manual application of a crank or wrench to turn the shafts. In this manner the part of the locking device which is to be turned to lock the carriage in position, may be located in an accessible position in the mechanism. In the instant case the locking device is located between the side gauges D, E (see Figs. 2 and 6).

The gauge carriages 96 are also movable transversely of the feeding mechanism to locate the gauging devices D, E for the transverse dimension of sheets of different sizes. For this purpose the slide rails 122 are slideably supported on pads 148 (Figs. 5 and 7) on the cross beams 123 of the main frame 27. The slide rails are formed with transverse depending tongues 151 (Fig. 9) which operate in slide grooves 152 in the pads.

Adjacent the pads 148 the slide rails 122 have depending lugs 153 (Figs. 7 and 9) which surround and which are threadedly connected with transverse adjusting screws 154 (see also Figs. 2 and 5). There are two of these adjusting screws for each slide rail and they are located near the ends of the rails. At the exit end of the mechanism the adjusting screws are carried in bearing blocks 155 formed on the pads 148. The outer ends of these two screws carry bevel gears 156 which mesh with bevel gears 157 mounted on a pair of longitudinal actuating shafts 158 carried in bearings 159 extending out from the side members of the main frame 27.

Adjacent the feed-in end of the mechanism the actuating shafts 158 carry bevel gears 161 which mesh with bevel gears 162 mounted on the adjusting screws 154 at this end of the mechanism. These screws are carried in suitable bearings formed on the main frame 27. The outer ends of these two screws extend beyond the frame and are formed with square heads 163 for the reception of a crank or a wrench for manually turning the screws.

Thus by turning one of the screws 154, the actuating shaft 158 and the other screw 154 connected therewith are turned in unison and thus the slide rail 122 and side gauges D, E carried thereon are shifted to a desired transverse position. The two slide rails and parts carried thereon are adjusted separately and independently.

All of the chains 90, 91, 101, 102 of the angularly disposed side gauging devices D, E are actuated continuously and in unison in whatever position they may be for sheet size. The chains on opposite sides of the path of travel of the sheets are operated in opposite directions so that the chain-runs adjacent the moving sheets, move in the direction of travel of the sheets and at the same speed as the sheets.

This continuous and synchronous actuation of the gauging chains 90, 91, 101, 102 is brought about by a train of gears which connects the driving sprocket shafts 97, 106 (Fig. 8) of the gauging devices. For this purpose the lower end of the driving sprocket shaft 106 of the gauging device E carries a spur gear 165 which meshes with an idler gear 16 (see also Fig. 9) carried on a ball bearing 167 mounted on the carriage lock bolt sleeve 134. The gear 165 is designed to pass up through the bore 112 in the carriage 96 when the gauging device E is removed and thereby in no way interfere with the removal of the device.

The idler gear 166 meshes with and is driven by a spur gear 168 mounted on the lower end of the driving sprocket shaft 97 of the gauging device D. The sprocket shaft 97 is driven by a helical gear 169 which is carried on the sprocket shaft and which is driven by a meshing helical gear 171.

There are two of these gear trains, one for each carriage 96 and the side gauges D, E carried thereon and they are separately driven in unison by a pair of longitudinal driving shafts 174 (Fig. 5) on which the helical gears 171 of the two gear trains are mounted. The helical gears 171 are disposed between a pair of bearings 175 formed on the carriages 96 and are slidably secured to the shafts by a key which is movable along the shaft in a groove 176 (see Fig. 9) formed in the shaft. Thus the helical gears 171 shift with the carriages 96 when changing gauges for A or B gauging, while maintaining a driving connection with the longitudinal drive shafts 174.

The longitudinal drive shafts 174 intermediate their ends are journaled in the carriage bearings 175. At the exit end of the mechanism the shafts are free and unsupported. At the feed-in end of the mechanism the shafts are journaled in suitable spaced bearings 178 (Fig. 5) formed in the gear housing 54 (see also Fig. 4) which surround the transverse gear shaft 48. Within the gear housings, the longitudinal shafts 174 carry helical gears 179 which mesh with and are driven by helical gears 181 keyed to the gear shaft 48.

The gear housings 54 are bolted to the carriage slide rails 122 and move with these rails for adjustment of the gauges D, E for sheets of different transverse dimension. The helical gears 181 within the housings are slidable along their gear shaft 48. In this manner a driving connection for the side gauges D, E is always maintained with the gear shaft 48 and through this shaft are actuated in the proper timed relation with the travel of a sheet C to be gauged as hereinbefore mentioned.

The chains of each of the conveyors 90, 91, 101, 102 of the gauging devices D, E intermediate their idler and driving sprockets are maintained in their properly spaced horizontal planes against sagging by spaced and parallel plates 185 (Figs. 6, 7 and 8) the outer longitudinal edges of which engage against and support the chains as shown in Fig. 16. There is one of these plates for each chain. These plates are held in separated relation by spacer sleeves 186 interposed between them. The plates and the sleeves are held in position by long bolts 187 which extend through these parts and are threadedly secured in bosses 188 formed on the carriages 96.

Gauging of a sheet C is effected while the sheet, propelled by the feeding conveyors 21 passes between the oppositely and angularly disposed chains 90, 91, 101, 102 of the gauging devices D, E as hereinbefore mentioned. This gauging is brought about by cooperating pairs of stop rollers or elements 191 (Figs. 6, 7, 13, 14 and 15) and tension rollers or elements 192 carried on the gauging conveyors. The stop rollers 191 are fixed gauging elements and are engageable against the side edges of a sheet C at predetermined gauging points for side gauging the sheet. There are two of these stop elements one for each of the side gauging devices D, E and they are both on the same side of the mechanism. The elements are disposed between and travel with the upper and lower chains of the conveyors 90, 101 and are mounted on vertical pins 193 (Fig. 15) the ends of which are secured in the chains of each device.

The tension rollers or elements 192 are movable and yieldable gauging elements and are engageable against the opposing side edges of a sheet C for shifting and maintaining the sheet in engagement with the stop elements 191. There are two tension rollers 192 one for each of the side gauging devices D, E and they are both on the same side of the mechanism and opposite the stop rollers 191. The tension rollers are disposed between and travel with the upper and lower chains of the conveyors 91, 102 and are mounted on a vertical pin 195 (Figs. 15 and 16) the ends of which are secured in a pair of spaced and parallel swing arms 196 mounted on pivot pins 197 carried in the upper and lower chains of the gauging conveyors 91, 102.

The tension rollers 192 are maintained under spring pressure to provide for their yielding action. For this purpose one end of a wire spring 198 engages against the upper end of the roller pin 195. The opposite end of the spring curves around the pivot end of one of the swing arms 196 as best shown in Fig. 16 and is secured to the inner end of the arm pivot pin 197. Thus the springs keep the tension rollers 192 normally in an outward or extended position relative to the gauging conveyors. Lugs 199 formed on the inner edges of the swing arms 196 adjacent the tension rollers 192 engage against the inner edges of the chains and limit the outward travel of the rollers for keeping them within a predetermined range.

The two stop rollers 191 and the two tension rollers 192 are mounted on their respective gauging conveyors 90, 101 and 91, 102 in transverse opposing alignment and travel with their conveyors in unison around the sprockets 92, 93 and 102, 104 and along the longitudinal inner and outer runs of the chains in this aligned relation. The two stop rollers 191 and also the two tension rollers 192 are also spaced apart longitudinally a predetermined distance at all times relative to each other.

In operation, as for B gauging when both gauging devices are used, the stop roller 191 and the tension roller 192 of the gauging devices D swing around their idler sprockets 92 simultaneously and toward each other with the movement of these rollers of the gauging devices E around their driving sprockets 104. This movement of the rollers around the sprockets brings them into the inner runs of the chains and thus all of the gauging rollers move into a position adjacent but not touching the side edges of a sheet C moving forward on the feed conveyors 21.

For B gauging this action is timed so that the gauging rollers are located near the ends of the sheet. For A gauging where only the gauging device D is used, this action is timed so that the gauging rollers of this device are located intermediate the ends of the sheet in a substantially midway relation. The sheet and the rollers travel forward together at the same speed and with the sheet interposed between the rollers as the latter move along the inner runs of their conveyor chains.

As the sheet C continues to advance along its straight line path of travel, the gauging rollers are moving inwardly at an angle to the sheet and thus gradually approach the sheet and gently engage against its opposite side edges. If one set or the other of the rollers on the same side of the sheet engages a sheet edge before the other, the sheet will be shifted laterally by the gauging set of rollers as the sheet moves forward. The purpose of such lateral shifting of the sheet is to bring it into engagement with the stop rollers 191 and to hold it in this position under the pressure of the springs 198 of the tension rollers 192.

Thus when the tension rollers 192 engage the adjacent edge of a moving sheet C and push the sheet laterally against the stop rollers 191 on the opposite side of the mechanism, the sheet is in a gauged position relative to its side edges and the tension rollers cannot move the sheet any further. Hence during the remainder of the travel of the tension rollers along the angularly disposed inner runs of the gauging conveyors, the rollers move along a straight line path of travel with the sheet and the difference between these two paths of travel is taken up by the tension springs 198.

As the moving sheet approaches this side gauged position, the side edge portions of the sheet are restrained from displacement out of their horizontal position. This keeps the sheet in a flat condition. For this purpose the sheet edge portions pass between a pair of upper and lower vertical retaining members 201, 202 (Figs. 6 and 7) having a clearance space between them slightly greater than the thickness of the sheets passing between them. There are four sets of these retaining members located one adjacent each gauging conveyor of the gauging devices D, E, The upper retaining members 201 are secured to overhanging brackets 203 which are bolted to the upper guide plates 185 of the gauging chains 90, 91, 101, 102. The lower retaining members 202 of the gauging devices D are bolted to bosses 204 formed on the carriages 96. These members for the gauging devices E are secured to suitable bosses formed on the brackets 109 so that the members will be removed with the gauging devices when they are lifted off for A gauging of the sheets.

Side gauging of a sheet is completed just before and is maintained while the gauging rollers 191, 192 pass into a gauging station indicated by a dot and dash line HH in Fig. 6, which is a line region extending transversely of the mechanism along a line connecting the centers of the driving sprockets 93 of the gauging devices D. This gauging station is related to the distance between it and the advancing rolls 87, 88 at the exit end of the mechanism and varies with the type of gauging used and the longitudinal dimension of the sheets to be gauged. The position of the gauging devices D determines the location of the gauging station H.

As a side gauged sheet approaches this gauging station H it is gauged along its rear edge to bring the sheet into a squared and fully gauged position. Gauging of the sheet along its rear edge is effected by the back gauges F hereinbefore mentioned. There are three of these back gauges and they comprise contact fingers 211 (Figs. 6 and 10) which are adjustably mounted on arms 212 secured to a continuously rotating back gauge shaft 213 which extends across the feeding mechanism. Manually operable adjusting screws 214 secured in the arms engage against the fingers for adjusting them into a predetermined position.

For B gauging a sheet, where only one back gauge is required, the middle back gauge is used while the contact fingers 211 of the two outer gauges are adjusted by the screws 214 into a position where they clear the sheet edge and therefore are out of engagement with this edge. For A gauging, the two outer contact fingers are adjusted into sheet gauging position and the middle finger is moved back out of the way. These adjustments for different types of gauging may be effected rapidly.

The back gauge shaft 213 is rotated continuously in time with the feeding conveyors 21. For this purpose the ends of the shaft are journaled in bearings 216 (Figs. 2 and 5) formed in blocks 217 supported on the main frame 27. One of the blocks is formed integrally with a gear casing 218 (see also Fig. 7) which surrounds the auxiliary drive shaft 58 disposed adjacent one side of the mechanism. Within the gear casing the back gauge shaft 213 carries a bevel gear 221 which meshes with and is driven by a bevel pinion 222 (Fig. 5) feathered onto but slideable along the auxiliary drive shaft 58.

Through this gear connection with the auxiliary drive shaft 58, the back gauge shaft 213 rotates the back gauges F through a rotary or circular path of travel below the sheets advanced by the feeding conveyors 21 and brings the back gauge fingers 211 up behind a side gauged sheet at the proper time for engagement against the rear edge of the sheet.

As the back gauge finger or fingers 211 contact the sheet edge, they advance the sheet forward and away from the feed dogs 22 on the feeding conveyors 21 and shift the sheet into a fully gauged position as shown in Fig. 6. This occurs just as the stop roller 191 and the cooperating tension roller 192 of the gauging device D come into alignment with the gauging station H. At this station the stop roller or rollers 191 engage against and are backed-up by backing hubs 225 (Fig. 15) formed integrally with and between the upper and lower adjacent driving sprockets 93 and idler sprockets 103.

The back gauge shaft 213 is movable longitudinally of the mechanism for properly positioning the back gauges F for different types of gauging and for sheets having different longitudinal dimensions. This is brought about by manual shifting of the blocks 217. For this purpose the blocks are slidably mounted on a pair of longitudinal rails 228 (Figs. 2, 5, 11, and 12) formed on the main frame 27 along its sides.

The blocks 217 are guided by a rack bar 229 which is secured to the top of the rails 228. This bar extends the full length of the rails and projects up into a slideway 231 formed in the bottom of the blocks. The two blocks, one on each side of the mechanism are connected by a transverse rod 233 which carries pinions 234 (Figs. 11 and 12) meshing with the rack bar 229. These pinions are carried in bearings 235 formed in the blocks. One end of the rod 233 extends beyond its block 217 and is formed with a square head 236 for the reception of a crank or wrench for turning the rod.

Hence by turning the transverse rod 233, the pinions 234 rotate on and travel along the rack bar 229. This action propels the two back gauge shaft blocks 217 in unison along their slide rails 228 and thus permits of shifting the back gauges F into a desired position relative to the side gauging device D.

After an adjustment of the back gauge shaft blocks 217 they are locked in position against displacement by locking bolts 237 (Fig. 11) located in the blocks. There are two of these bolts for each block. The lower ends of the bolts are formed with T-shaped heads 238 (Fig. 11) which operate in T slots 239 (Figs. 5 and 12) formed in and longitudinally of the rails 228 and the rack bars 229 so that the bolts will travel with the blocks. The upper ends of the bolts extend above the blocks and are equipped with nuts. By tightening these nuts the bolts may be drawn tight in the T slots 239 and thereby lock the blocks against movement. The bolts are loosened when adjustment of the blocks becomes necessary.

When a sheet C is in a fully gauged position as shown in Fig. 2, its forward edge portion extends beyond the feeding mechanism and is disposed between the advancing rolls 87, 88 which are momentarily separated or open at this time. As soon as the sheet reaches this fully gauged position, the upper advancing rolls 87 move down against the sheet, clamping it tightly against the lower advancing rolls 88 and thus together rapidly pull the gauged sheet out of the feeding mechanism and advance it into or toward the subsequent operation machine as hereinbefore mentioned.

This clamping of the gauged sheet between the advancing rolls 87, 88 arrests any further action of the gauging devices on the sheet and thereby prevents the gauging devices from inadvertently shifting the sheet out of its gauged position after it has once been gauged and ready for further advancement.

Movement of the upper advancing rolls 87 into an open position to permit the entrance of the sheet between the rolls and to close them against the sheet and the lower rolls, to advance the sheet, is effected in time with the movement of the sheet and by differential devices located in the drive housings 63, 75 (Fig. 17). These differential devices include the differential gear 71 and the pinion 77 located in the drive housing 63 and a similar differential gear 245 (Figs. 17 and 19) and pinion 246 located in the drive housing 75. The differential gears 71, 245 are loose on the main drive shaft 72. The pinions 77, 246 are keyed to the upper roll shaft 78. Each of the pinions 77, 246 are formed integrally with cam rollers 247 (see also Fig. 18) which rotate on edge cams 243 formed integrally with the gears 71, 245.

Hence as the main shaft 72 rotates the roll shaft 78, through the connecting gears 85, 86, and pinions 77, 246 carried on the roll shaft rotate the differential gears 71, 245 loosely mounted on the drive shaft and thereby rotate the cams 248 at a speed slower than that of either shaft. The speed of rotation of the cams is calculated to provide one rotation of the cams for each sheet C passing through the gauging station H.

Thus once for each sheet, the cams 248 raise the cam rollers 247 and the roll shaft 78 connected therewith to permit the forward edge portion of a gauged sheet to enter between the rolls 87, 88 for clamping and advancing the gauged sheet as hereinbefore mentioned. It is for this reason that the roll shaft is mounted in the slide bearings 79.

The separation of the rolls 87, 88 is just sufficient to permit a sheet to enter between them and is not great enough to effect an unmeshing of the gears carried on the roll shaft 78 and the main drive shaft 72. Support extensions 251 (Figs. 2 and 6) of the feeding conveyor support rails 25 project into the spaces adjacent the advancing rolls for supporting the sheets as they enter between the rolls. This advancement of the gauged sheet C into the subsequent operation machine completes the cycle of operations on the sheet.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a sheet feeding and gauging mechanism, the combination of feeding means engageable with a rear edge of a sheet for advancing it along a path of travel, a plurality of back gauges operable in the path of travel of the sheet for gauging contact with the rear edge of the sheet, a plurality of side gauges operable at one side of the path of travel of the sheet for gauging contact with the adjacent side edge of the sheet, and means for making some of said back gauges or some of said side gauges inoperative so that at least two of one kind of said gauges make contact with one of said edges of the sheet and one of the other kind of said gauges makes contact with the other of said edges of the sheet for locating the sheet in a predetermined gauged position.

2. In a sheet feeding and gauging mechanism, the combination of feeding means engageable with a rear edge of a sheet for advancing it along a path of travel, a plurality of back gauges operable in the path of travel of the sheet for gauging contact with the rear edge of the sheet, two gauge conveyors operable in unison at one side of the path of travel of the sheet, a side gauge carried on each of said conveyors for gauging contact with the adjacent side edge of the sheet, and means for setting said back gauges and said gauge conveyors at the desired distances from said sheet so that two of one kind of said gauges make contact with one of said edges of the sheet and one of the other kind of said gauges makes contact with the other of said edges of the sheet for locating the sheet in a predetermined gauged position.

3. In a sheet feeding and gauging mechanism, the combination of feeding means engageable with a rear edge of a sheet for advancing it along a path of travel, three back gauges operable in the path of travel of the sheet for gauging contact with the rear edge of the sheet, a pair of gauge conveyors operable in unison at one side of the path of travel of the sheet and each conveyor operable at an angle thereto, a side gauge carried on each of said conveyors for gauging contact with a side edge of the sheet, and means for setting said back gauges and said gauge conveyors in one of two selected positions so that the two side gauges make contact with the side edge of the sheet and one of the back gauges makes contact with the back edge of the sheet or so that one side gauge and two back gauges contact the sheet side and back edges for locating the sheet in the desired gauged position.

4. In a sheet feeding and gauging mechanism, the combination of feeding means engageable with a rear edge of a sheet for advancing it along a path of travel, a plurality of back gauges operable in the path of travel of the sheet for gauging contact with the rear edge of the sheet, a plurality of pairs of gauge conveyors operable in unison and disposed adjacent and on opposite sides of the path of travel of the sheet, stop elements carried on each of the conveyors located on one side of the path of travel of the sheet for gauging contact with the adjacent side edge of the sheet, cooperating tension gauge elements carried on each of the conveyors located on the opposing side of the path of travel of the sheet for gauging contact with the adjacent side edge of the sheet, and means for setting said back gauges and cooperating pairs of gauge conveyors on each side of the path of travel of the sheet so that for one setting the gauges effective against a sheet for locating it in a gauged position included two stop elements, two cooperating tension gauges and one back gauge, and for another setting include one stop element, one cooperating tension gauge and two back gauges.

5. In a sheet feeding and gauging mechanism, the combination of feeding means engageable with a rear edge of a sheet for advancing it along a path of travel, a plurality of back gauges operable in the path of travel of the sheet for gauging contact with the rear edge of the sheet, a plurality of pairs of gauge conveyors operable in unison and disposed adjacent and on opposite sides of the path of travel of the sheet and at an angle thereto and movable in time with the travel of the sheet, stop elements carried on each of the conveyors located on one side of the path of travel of the sheet for gauging contact with the adjacent side edge of the sheet, cooperating tension gauge elements carried on each of the conveyors located on the opposing side of the path of travel of the sheet for gauging contact with the adjacent side edge of the sheet for gradually shifting the sheet laterally into engagement with said stop elements, and means for setting said back gauges and cooperating pairs of gauge conveyors on each side of the path of travel of the sheet so that for one sheet the gauges effective thereagainst for locating the sheet in a gauged position include two stop elements, two cooperating side gauges and one back gauge, and for another sheet include one stop element, one cooperating side gauge and two back gauges.

6. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a pair of side stop elements disposed adjacent one side of the path of travel of the sheet, a pair of side tension gauge elements disposed adjacent the opposite side of the path of travel of the sheet and movable therealong in time with the travel of the sheet for engaging the sheet at predetermined points and gradually shifting the sheet laterally into engagement with said stop elements, and means for setting said back gauge elements and said side gauge elements so that at least two of one kind of said gauge elements make contact with one of said edges of the sheet and one of the other kind of said gauge elements makes contact with the other of said edges of the sheet for differently gauging and locating sheets of different dimensions in predetermined gauged positions.

7. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a pair of side stop elements disposed adjacent one side of the path of travel of the sheet, a pair of side tension gauge elements disposed adjacent the opposite side of the path of travel of the sheet and movable at an angle thereto in time with the travel of the sheet for engaging the sheet at predetermined points and gradually shifting the sheet laterally into engagement with said stop elements, and means for setting said back gauge elements and said side gauge elements so that at least two of one kind of said gauge elements make contact with one of said edges of the sheet and one of the other kind of said gauge elements makes contact with the other of said edges of the sheet for differently gauging and locating sheets of different dimensions in predetermined gauged positions.

8. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a pair of side tension elements disposed adjacent one side of the path of travel of the sheet, a pair of side stop elements disposed adjacent the opposite side of the path of travel of the sheet and movable therealong in time with the travel of the sheet for engaging the sheet at predetermined points and gradually shifting the sheet laterally into engagement with said tension elements, and means for setting said back stop elements and said side gauge elements so that at least two of one kind of said gauge elements make contact with one of said edges of the sheet and one of the other kind of said gauge elements makes contact with the other of said edges of the sheet for differently gauging and locating sheets of different dimensions in predetermined gauged positions.

9. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a pair of side tension elements disposed adjacent one side of the path of travel of the sheet, a pair of side stop elements disposed adjacent the opposite side of the path of travel of the sheet and movable at an angle thereto in time with the travel of the sheet for engaging the sheet at predetermined points and gradually shifting the sheet laterally into engagement with said tension elements, and means for setting said back gauge elements and said side stop elements so that at least two of one kind of said gauge elements make contact with one of said edges of the sheet and one of the other kind of said gauge elements makes contact with the other of said edges of the sheet for differently gauging and locating sheets of different dimensions in predetermined gauged positions.

10. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a pair of side stop elements movable along one side of the path of travel of the sheet, a pair of side tension gauge elements disposed adjacent the opposite side of the path of travel of the sheet and movable at an angle thereto in time with the travel of the sheet for engaging the sheet at predetermined points and gradually shifting the sheet laterally into engagement with said stop elements and means for setting said back gauge elements and said side gauge elements so that at least two of one kind of said gauge elements make contact with one of said edges of the sheet and one of the other kind of said gauge elements makes contact with the other of said edges of the sheet for differently gauging and locating sheets of different dimensions in predetermined gauged positions.

11. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a pair of side tension elements movable along one side of the path of travel of the sheet, a pair of side stop elements disposed adjacent the opposite side of the path of travel of the sheet and movable at an angle thereto in time with the travel of the sheet for engaging the sheet at predetermined points and gradually shifting the sheet laterally into engagement with said tension elements, and means for setting said back gauge elements and said side stop elements so that at least two of one kind of said gauge elements make contact with one of said edges of the sheet and one of the other kind of said gauge elements makes contact with the other of said edges of the sheet for differently gauging and locating sheets of different dimensions in predetermined gauged positions.

12. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a pair of side stop elements disposed adjacent one side of the path of travel of the sheet and selectively movable for gauging contact with the adjacent side of the sheet, backing up means operable on said side stop elements during their gauging operation for retaining them in an unvarying path, a pair of side tension gauge elements disposed adjacent the opposite side of the path of travel of the sheet and movable therealong in time with the travel of the sheet for engaging the sheet at predetermined points and gradually shifting the sheet laterally into engagement with said stop elements, and means for setting said back gauge elements and said side gauge elements so that at least two of one kind of said gauge elements make contact with one of said edges of the sheet and one of the other kind of said gauge elements makes contact with the other of said edges of the sheet for differently gauging and locating sheets of different dimensions in predetermined gauged positions.

13. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a pair of side stop elements movable along one side of the path of travel of the sheet and through a gauging station in time with the travel of the sheet for gauging contact with the adjacent side of the sheet, backing-up means at said gauging station and operable on said side stop elements during their gauging operation for retaining them in an unvarying path, a pair of side tension gauge elements disposed adjacent the opposite side of the path of travel of the sheet and movable at an angle thereto in time with the travel of the sheet for engaging the sheet at predetermined points and gradually shifting the sheet laterally into engagement with said stop elements to bring it into gauged position at said gauging station, and means for setting said back gauge elements and said side gauge elements so that at least two of one kind of said gauge elements make contact with one of said edges of the sheet and one of the other kind of said gauge elements makes contact with the other of said edges of the sheet for differently gauging and locating sheets of different dimensions in predetermined gauged positions at said gauging station.

14. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a plurality of conveyor units comprising one pair disposed on each side of the path of travel of the sheet and operable in time with the travel of the sheet, a side stop element carried on each of the conveyors disposed on one side of the path of travel of the sheet for cooperation with said back gauges in gauging a sheet, a side tension element carried on each of the conveyors disposed on the opposite side of the path of travel of the sheet for shifting the sheet into engagement with said stop elements, a movable mounting for two oppositely disposed units of said conveyors, an auxiliary mounting movable with said movable mounting for the other two oppositely disposed units of said conveyors, said auxiliary mounting and the conveyor units therefor being usable with said movable mounting and the conveyor units therefor for one kind of sheet gauging and not being usable with said movable mounting and the conveyor units therefor for another kind of sheet gauging, and means for shifting said movable mounting into a desired gauging position for the proper kind of gauging.

15. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a plurality of conveyor units comprising one pair disposed on each side of the path of travel of the sheet and operable in time with the travel of the sheet, a side stop element carried on each of the conveyors disposed on one side of the path of travel of the sheet for cooperation with said back gauges in gauging a sheet, a side tension element carried on each of the conveyors disposed on the opposite side of the path of travel of the sheet for shifting the sheet into engagement with said stop elements, a movable mounting for two oppositely disposed units of said conveyors, an auxiliary mounting movable with said movable mounting for the other two oppositely disposed units of said conveyors, said auxiliary mounting and the conveyor units therefor being usable with said movable mounting and the conveyor units therefor for one kind of sheet gauging and not being usable with said movable mounting and the conveyor units therefor for another kind of sheet gauging, means for shifting said movable mounting into a desired gauging position for the different kinds of gauging, and separate means for shifting said back gauges relative to said movable mounting for the different kinds of gauging.

16. In a sheet feeding and gauging mechanism, the combination of feeding means engageable with a rear edge of a sheet for advancing it along a path of travel, a plurality of rotatable back gauges operable in the path of travel of the sheet and selectively movable for gauging contact with the rear edge of the sheet, a movable submounting for said back gauges, means for shifting said submounting longitudinally of the mechanism for locating said back gauges in a selected position in accordance with the dimensions of the sheets to be gauged for gauging sheets of different sizes, means for shifting each of said back gauges independently relative to each other for using said gauges selectively in accordance with the type of gauging to be used, a pair of side stop elements disposed adjacent one side of the path of travel of the sheet, a pair of side tension gauge elements disposed adjacent the opposite side of the path of travel of the sheet and movable therealong in time with the travel of the sheet for engaging the sheet at predetermined points and gradually shifting the sheet laterally into engagement with said stop elements, and means for arranging said side gauge elements so that two of said side gauge elements can be used with one of said back gauges for one kind of gauging and one of said side gauge elements can be used with two of said back gauges for another kind of gauging for differently gauging and locating sheets of different dimensions in predetermined gauged positions.

17. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a pair of side stop elements disposed adjacent one side of the path of travel of the sheet, a pair of side tension gauge elements disposed adjacent the opposite side of the path of travel of the sheet and movable theralong in time with the travel of the sheet for engaging the sheet at predetermined points and gradually shifting the sheet laterally into engagement with said stop elements, means for setting said back gauge elements and means for shifting said side gauge elements longitudinally and transversely of the mechanism for different kinds of gauging and so that at least two of one kind of said gauge elements make contact with one of said edges of the sheet and one of the other kind of said gauge elements makes contact with the other of said edges of the sheet for differently gauging and locating sheets of different dimensions in predetermined gauged positions.

18. In a sheet feeding and gauging mechanism, the combination of feeding means engageable with a rear edge of a sheet for advancing it along a path of travel, a plurality of back gauges operable in the path of travel of the sheet and selectively movable for gauging contact with the rear edge of the sheet, a pair of movable carriages disposed one on each side of the path of travel of the sheet, a side gauging conveyor carried on each of said carriages, a bracket removable secured to each of said carriages, a side gauging conveyor carried on each of said brackets, means for driving said gauging conveyors in unison, a side stop element carried on each of the gauging conveyors disposed on one side of the path of travel of the sheet for co-operation with said back gauges in gauging a sheet, a side tension element carried on each of the conveyors disposed on the opposite side of the path of travel of the sheet for shifting the sheet into engagement with said stop elements, means for shifting said carriages simultaneously and longitudinally of the mechanism for positioning the gauging conveyors for different kinds of gauging, and separate means for shifting said carriages independently and transversely of the mechanism for positioning the gauging conveyors for sheets of different dimensions.

RONALD E. J. NORDQUIST.
BRUNO A. BAUMANN.

REFERENCES CITED

The following references are of record in the file of this patent:

UNITED STATES PATENTS

| Number | Name | Date |
|---|---|---|
| 1,029,159 | Westerbeck | June 11, 1912 |